United States Patent Office 3,377,344
Patented Apr. 9, 1968

3,377,344
HYDRAZONES OF 1-AMINO-4-DIBENZOCYCLO-HEPTENYLPIPERAZINES
John W. Cusic, Skokie, and Peter Yonan, Chicago, Ill., assignors to G. D. Searle & Co., Chicago, Ill., a corporation of Delaware
No Drawing. Continuation-in-part of application Ser. No. 362,929, Apr. 27, 1964. This application Mar. 25, 1966, Ser. No. 537,308
Claims priority, application Great Britain, Apr. 12, 1965, 15,469/65
15 Claims. (Cl. 260—240)

ABSTRACT OF THE DISCLOSURE

Hydrazones derived from 1-amino-4-(dibenzocyclo-heptenyl and dibenzocyclyooctenyl)piperazines and a variety of aldehydes and ketones are described herein. These hydrazones are useful as anticonvulsant agents. They are usually prepared by the reaction of an amino-piperazine with an aldehyde or ketone.

The present application is a continuation-in-part of application Ser. No. 362,929, filed Apr. 27, 1964, and now U.S. Patent 3,290,300.

The present invention relates to a group of compounds which are hydrazones derived from 1-amino-4-dibenzocycloheptenylpiperazines and a variety of aldehydes and ketones. More particularly, the present invention relates to compounds having the following general formula

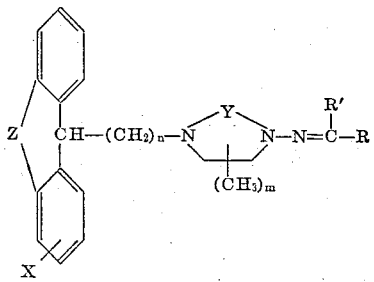

wherein X is selected from the group consisting of hydrogen, methyl and halogen; Y is selected from the group consisting of lower alkylene containing from 2 to 3 carbon atoms inclusively; Z is selected from the group consisting of vinylene and lower alkylene containing from 2 to 3 carbon atoms inclusively; $m$ and $n$ are each a whole number between 0 and 1 inclusive; =CRR' is 1-methyl-4-piperidylidene, 9-fluorenylidene, or, individually, R is methyl, phenyl, substituted phenyl, pyridyl, or substituted pyridyl and R' is selected from the group consisting of hydrogen and methyl.

Thus, R can represent methyl, phenyl, tolyl, halophenyl, hydroxyphenyl, methoxyphenyl, methylenedioxyphenyl, cyanophenyl, pyridyl, methylpridyl, ethylpyridyl, hydroxypridyl, and N-oxides of the aforesaid pyridyl groups. A particularly preferred embodiment of this invention are those compounds wherein R' is hydrogen and R is pyridyl, methylpyridyl, or the N-oxides of these pyridyl radicals.

The halogens referred to above include fluorine, chlorine, bromine, and iodine. The halophenyl radicals referred to above include fluorophenyl, chlorophenyl, bromophenyl, and iodophenyl.

Y and Z are restricted to those values of lower alkylene in which the free valences are of different carbon atoms, and it is particularly preferred to have the free valence on the terminal carbon atoms. Thus, ethylene and trimethylene are particularly preferred alkylene values for these groups.

The compounds of this invention are useful because of their pharmacological activity. More specifically, these compounds are useful because of their anti-convulsant activity. Thus, like diphenylhydantoin, they antagonize electroshock seizures. In addition, they show activity against convulsions induced by pentylenetetrazol.

The organic bases of this invention form nontoxic acid addition salts with a variety of organic and inorganic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are conveniently prepared by the condensation of an aldehyde or ketone with a hydrazine of the following general structure

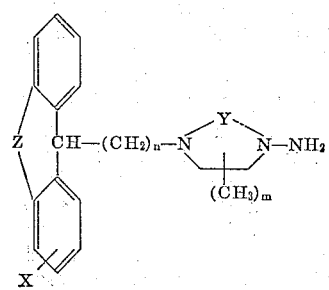

wherein X, Y, Z, $m$ and $n$ are defined as above. The reaction is conveniently carried out in an inert solvent. That is, the reaction is carried out in a solvent which will not react with the aldehyde, ketone, or hydrazine used. Useful solvents for this reaction are alcohols such as ethanol and 2-propanol and aromatic hydrocarbons such as benzene and toluene. The reaction can optionally be carried out in the presence of a small amount of acid which serves to promote the reaction. Acetic acid is an example of an acid useful for this purpose.

Although aldehydes and ketones are the most convenient starting materials for use in this reaction, carbonyl derivatives are also useful. For example, it is possible to use acetals, ketals, diacetates, and other carbonyl derivatives which can be readily converted to carbonyl compounds in the reaction mixture. Nitrones, which can be converted to carbonyl compounds in the reaction mixture, are also useful. Particularly useful in this regard are compounds such as N-(4-dimethylaminophenyl)-α-(N-oxidopyridyl)nitrones.

The following examples are presented to further illustrate the present invention; they should not be construed as limiting it in spirit or in scope. In these examples, quantities are indicated in parts by weight unless parts by volume are indicated and temperatures are given in degres centigrade (° C.). The relationship between parts by volume and parts by weight is the same as that between milliliters and grams.

EXAMPLE 1

A solution of 38 parts of 2-chloro-10,11-dihydro-5H-dibenzo[a,d]cyclohepten-5-one in 175 parts of ether is added portionwise to a stirred mixture of 10 parts of lithium aluminum hydride in 525 parts of ether. After the addition is complete, the mixture is refluxed for 2 hours. It is then cooled in an ice bath and decomposed by the cautious addition of (1) 15 parts of water in 27 parts of tetrahydrofuran, (2) 5 parts of sodium hydroxide in 10 parts of water, and (3) 35 parts of water. The resultant mixture is filtered and the salts separated in this way are washed with ether. The resultant filtrate is then dried and the solvent is evaporated under reduced pressure to leave a residual oil which solidifies. The product obtained in this way is 2 - chloro-10,11-dihydro-5H-dibenzo[a,d]cyclohepten-5-ol melting at about 90–92° C.

A solution of 36 parts of 2-chloro-10,11-dihydro-5H-dibenzo[a,d]cyclohepten-5-ol in 375 parts of chloroform is prepared. Hydrogen chloride gas is then bubbled through this solution for 15 minutes and then nitrogen gas is bubbled through the solution to remove excess hydrogen chloride. The solution is then dried and the solvent is evaporated under reduced pressure to leave a residual oil. Trituration of this oil with hexane gives a solid which melts at about 96–97° C. after recrystallization from hexane. The product obtained in this way is 2,5-dichloro-10,11-dihydro-5H-dibenzo[a,d]cycloheptene.

EXAMPLE 2

To a solution of 200 parts of homopiperazine in 100 parts of water is added 450 parts of concentrated hydrochloric acid over a period of 30 minutes while the temperature is maintained at about 40–45° C. The solution is then cooled to 0° C. and a solution of 141 parts of sodium nitrite in 280 parts of water is added portionwise while the temperature is maintained at 0–5° C. The mixture is stirred for an additional 15 minutes after the addition is complete, and then cooled in an ice bath. A solution of 1000 parts of 50% aqueous sodium hydroxide solution is added portionwise while the temperature is maintained below 25° C. The oily layer which forms is separated and the aqueous layer is extracted with chloroform. The oily layer and the chloroform extracts are then combined, dried, and distilled to give 1-nitrosohomopiperazine boiling at about 110–115° C. at 0.2 mm. pressure.

If the above procedure is repeated using 2,5-dimethylpiperazine as the starting material for the nitrosation, the product obtained is 1-nitroso-2,5-dimethylpiperazine boiling at about 120° C. at 0.3 mm. pressure. This material solidifies to give a product melting at about 73–74° C.

EXAMPLE 3

A mixture of 23 parts of 5-chloro-10,11-dihydro-5H-dibenzo[a,d]cycloheptene, 12 parts of 1-nitrosopiperazine, 20 parts of potassium carbonate, 5 parts of sodium iodide, and 320 parts of 2-butanone is stirred and refluxed for 16 hours. The resultant mixture is filtered to remove salts and the solvent is evaporated from the filtrate under reduced pressure. The resultant residue is dissolved in chloroform and the chloroform solution is washed with water and dried and the solvent is evaporated under reduced pressure to leave a crystalline residue. Ether is added to this residue which is then filtered. The product obtained in this way is 1-(10,11-dihydro-5H-dibenzo[a,d]cyclohepten - 5-yl)-4-nitrosopiperazine and it melts at about 193–194° C. after recrystallization from a mixture of chloroform and ether.

A solution of 21 parts of the above nitroso compound in 280 parts of hot tetrahydrofuran is added portionwise, with stirring, to a suspension of 8 parts of lithium aluminum hydride in 420 parts of tetrahydrofuran. This addition is carried out over a period of 1 hour at a temperature of 40–45° C. The mixture is then heated for 2 hours at 45–50° C. before it is cooled in an ice bath and decomposed by the cautious dropwise addition of water. The reaction mixture is filtered to remove precipitated salts and the solvent is evaporated from the filtrate to leave a residual solid which is mixed with ether and then filtered. The product thus obtained is 1-(10,11-dihydro-5H-dibenzo[a,d]cyclohepten-5-yl)-4-aminopiperazine and it melts at about 145–146° C. after recrystallization from a mixture of chloroform and hexane. This compound has the following formula

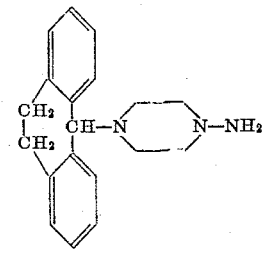

If an equivalent quantity of 2,5-dichloro-10,11-dihydro-5H - dibenzo[a,d]cycloheptene is substituted for the 5-chloro-10,11-dihydro-5H-dibenzo[a,d]cycloheptene in the procedure described in the preceding two paragraphs, there is first obtained 1-(2-chloro-10,11-dihydro-5H-dibenzo-[a,d]cyclohepten-5-yl)-4-nitrosopiperazine which is then reduced to give 1 - (2-chloro-10,11-dihydro-5H-dibenzo-[a,d]cyclohepten-5-yl)-4-aminopiperazine.

In a similar manner, 3,5-dichloro-10,11-dihydro-5H-dibenzo[a,d]cycloheptene reacts with 1-nitrosopiperazine to give 1 - (3-chloro-10,11-dihydro-5H-dibenzo[a,d]cyclohepten - 5 - yl)-4-nitrosopiperazine melting at about 187–188° C. Reduction of this nitroso compound with lithium aluminum hydride according to the procedure described above gives 1 - (3-chloro-10,11-dihydro-5H-dibenzo[a,d]cyclohepten-5-yl)-4-aminopiperazine melting at about 157–158° C. after recrystallization from a mixture of tetrahydrofuran and hexane.

Likewise, the reaction of 2-methyl-5-chloro-10,11-dihydro-5H-dibenzo[a,d]cycloheptene with 1-nitrosopiperazine according to the procedure described in the first two paragraphs above first gives 1-(2-methyl-10,11-dihydro - 5H - dibenzo[a,d]cyclohepten-5-yl) - 4 - nitrosopiperazine and then, on reduction, 1-(2-methyl-10,11-dihydro-5H-dibenzo[a,d]cyclohepten - 5 - yl) - 4 - aminopiperazine.

If 1-nitrosohomopiperazine is substituted for the 1-nitrosopiperazine and the procedure of the first two paragraphs of this example is repeated, there is obtained first, 1-(10,11-dihydro-5H-dibenzo[a,d]cyclohepten - 5-yl)-4-nitrosohomopiperazine, and then 1-(10,11-dihydro-5H-dibenzo-[a,d]cyclohepten-5-yl-4-aminohomopiperazine.

EXAMPLE 4

A solution is prepared from 45 parts of 5-chloro-5H-dibenzo[a,d]cycloheptene and 560 parts of 2-butanone. To this solution is added 55 parts of potassium carbonate and then 24 parts of 1-nitrosopiperazine. This mixture is allowed to stir at room temperature for about 23 hours and then refluxed for 3 hours. It is then filtered and the solvent is evaporated from the filtrate under reduced pressure to leave a residual solid. Ether is added to the residue which is then filtered to give 1-(5H-dibenzo[a,d]cyclohepten-5-yl)-4-nitrosopiperazine melting at about 184–195° C.

A solution of 26 parts of the above nitroso compound in 135 parts of tetrahydrofuran is added dropwise with stirring to a suspension of 10 parts of lithium aluminum hydride in 765 parts of tetrahydrofuran. The addition takes place at about 30° C. over a period of about 25 minutes. The mixture is then stirred at this temperature for an additional 15 minutes before it is cooled to about 5° C. and decomposed by the cautious dropwise addition of (1) 15 parts of water in 27 parts of tetrahydrofuran, then (2) 10 parts of sodium hydroxide in 20 parts of water, and finally (3) 25 parts of water. The mixture is then filtered and the separated salts are washed with hot tetrahydrofuran. The filtrate is dried and the solvent is evaporated under reduced pressure to leave a residual solid. This solid is mixed with hexane and then filtered to give 1 - (5H - dibenzo[a,d]cyclohepten-5-yl)-4-aminopiperazine melting at about 165–167° C.

batch, semi-continuous or continuous and mixtures of thiobis compounds are useful.

To avoid oxidation, the treatment is generally conducted under a blanket of inert gas such as nitrogen, carbon dioxide, steam and the like.

The disproportionation and bleaching achieved by the method of the invention are surprising results since the effects are simultaneous and it would not be expected that the treating compounds, some of which are known antioxidants, would be disproportionation catalysts as well as bleaching agents. In this regard, the invention is distinguished from that of copending application Ser. No. 579,819 filed Sept. 16, 1966, which describes bleaching of rosin compounds with the treating compounds in that the conditions of treatment in the latter case are less stringent and involve little or no transformation of abietic acid as compared with the present invention wherein abietic acid is reduced to less than about 15% by weight of the rosin.

The following examples further illustrate the invention but are not limitative thereof except as indicated in the appended claims. All parts and percentages are by weight unless otherwise specified.

TABLE I

| | Example | | | |
|---|---|---|---|---|
| | 1 | | 2 | |
| | Feed | Product | Feed | Product |
| TBP, percent | 0.1 | | 0.4 | |
| Abietic Acid, percent | 30.5 | 3.0 | 30.5 | 1.7 |
| Color | X | 4A | 2A | 3A |

EXAMPLES 3–4

Table II reports the effect of treating the same type tall oil rosin as in Examples 1–2 employing the same thiobisphenol and following substantially the same procedure except that heating was at 350° C. for a total of 2 hours. The reaction mixtures were sampled each half hour for color and abietic acid determinations, the latter by UV. Initial abietic acid content was about 27% and initial color was Y. The examples show very rapid disproportionation and bleaching at this more elevated temperature.

TABLE II

| | Example | | | | | |
|---|---|---|---|---|---|---|
| | 3 | | | 4 | | |
| Time, Hrs. | 0.1K TBP | | | 0.5K TBP | | |
| | Abietic Acid Percent | Dehydroabeitic Acid Percent | Color | Abietic Acid Percent | Dehydroabietic Acid, Percent | Color |
| ½ | 2.6 | 31.8 | 3A | 1.2 | 34.7 | 2A |
| 1 | 1.0 | 33.8 | WG | 0.8 | 33.9 | X |
| 1½ | 0.7 | 36.6 | WG | 0.7 | 35.3 | X |
| 2 | 0.7 | 36.1 | WG | 0.8 | 36.2 | WW |

EXAMPLES 5–6

In essentially the same manner as in Examples 1–4, the same type rosin was heated at 300° C. with 0.2% of the thiobisphenols indicated in Table III for 6 hours with sampling after each 2 hours for acid and color analyses. Good disproportionation and bleaching resulted in each instance.

TABLE III

| | Time, hours, Feed | Abeitic Acid, Percent- 31.2 | Dehydroabietic Acid, Percent | Color, Y |
|---|---|---|---|---|
| Example 5—4,4-'thiobis(6-tert-butyl-meta cresol) | 2 | 9.4 | 22.4 | 6A |
| | 4 | 7.1 | 41.4 | 6A |
| | 6 | 3.3 | 32.5 | 6A |
| Example 6—4,4'-thiobis(6-tert-butyl-ortho cresol) | 2 | 9.0 | 24.0 | 6A–7A |
| | 4 | 6.1 | 30.7 | 6A–7A |
| | 6 | 3.0 | 33.1 | 5A |

EXAMPLES 1–2

The data of Table I is based on reactions conducted substantially as follows:

To a suitable reaction vessel was charged tall oil rosin conforming to the Naval Stores Act (Feb. 8, 1952) and Federal Specification LLL–R–6266, Class C (May 27, 1957), except for less bottoms content. To this was added the indicated amount of TBP, i.e., 2,2'-thiobis (4-methyl-6-t-butylphenol). The mixture was then heated at 300° C. for 5 hours. The data shows effective disproportionation and bleaching. Abietic acid content was determined by UV and the colors are based on the conventional French scale wherein 4A represents four grades lighter than X and 3A is one grade lighter than 2A.

EXAMPLES 7–8

Table IV below demonstrates effective disproportionation of two mixtures containing rosin. Example 7 is a mixture of 55 parts of a tall oil fraction of typical analysis 94.2% fatty acids, 4.2% rosin acids, and 1.6% unsaponifiables, and 45 parts of the same type rosin as in Examples 1–6. Example 8 mixture is a crude tall oil distillate having the indicated analysis. Temperature of treatment was 300° C., 0.2% of 2,2'-thiobis(4-methyl-6-t-butylphenol was employed in each example, and treatment was effected under a cover of steam rather than nitrogen. Good disproportionation resulted in both instances. "GLC" refers to a gas-liquid chromatographic analysis.

TABLE IV

| | Example | | | | | | | |
|---|---|---|---|---|---|---|---|---|
| | 7 | | | | 8 | | | |
| | Feed | 2 Hrs. | 4 Hrs. | 6 Hrs. | Feed | 2 Hrs. | 4 Hrs. | 6 Hrs. |
| GLC Analyses: | | | | | | | | |
| Oleic Acid, percent | 25.7 | 31.3 | 32.6 | 33.6 | 26.0 | 28.7 | 28.4 | 31.6 |
| Linoleic: | | | | | | | | |
| Conjugated, percent | 7.0 | 12.5 | 10.5 | 8.3 | 6.1 | 11.1 | 9.3 | 8.1 |
| Non-Conjugated, percent | 20.9 | 7.2 | 4.9 | 4.4 | 20.1 | 8.0 | 5.9 | 5.0 |
| Abietic Acid, percent | 12.1 | 0.5 | 0.0 | 0.0 | 12.7 | 0.5 | 0.0 | 0.0 |
| Dehydroabietic Acid, percent | 9.9 | 24.0 | 26.2 | 28.2 | 8.6 | 21.2 | 24.7 | 25.4 |

EXAMPLES 9–15

Tall oil rosin of the type of Examples 1–6 and the indicated amount of 2,2'-thiobis(4-methyl-6-t-butylphenol) were charged to a 1000-ml. 3-neck flask equipped with a gas inlet tube, thermometer, agitator and condenser. The temperature was raised to approximately 200° C. under nitrogen and then steam substituted for the nitrogen. The disproportionation was carried out at the temperature and concentrations noted in Table V. The reaction was sampled periodically and disproportionation followed by UV analysis. Good disproportionation and bleaching is evident from the results (shown in Table V).

EXAMPLES 19–20

Example 19 of Table VII below show comparative results when the rosin type of Example 1 is disproportionated by heating for 6 hours with the thiobisphenol (TBP) of Example 1 and when disproportionation is attempted under the same conditions with the known antioxidant MBP, i.e., 2,2'-methylenebis(4-methyl-6-tert-butylphenol). Good disproportionation over the control (rosin heated under same conditions without additive) is evident in the case of treatment in the presence of TBP but essentially no benefit results when MBP is employed.

TABLE V

| Example | Temperature, °C., Feed | Concentration percent | Time, Hours | Abietic Acid, percent, 30.2 | Dehydro-Abietic Acid, percent | Color Y |
|---|---|---|---|---|---|---|
| 9 | 310 | 0.1 | 2 | 3.1 | 31.6 | 6A |
| | | | 4 | 1.5 | 34.9 | 4A |
| | | | 5 | 1.3 | 35.2 | 4A |
| 10 | 300 | 0.1 | 2 | 6.1 | 26.7 | 6A |
| | | | 4 | 3.3 | 31.4 | 6A |
| | | | 6 | 2.3 | 33.5 | 4A |
| 11 | 300 | 0.4 | 1 | 5.6 | 25.6 | 6A |
| | | | 3 | 2.2 | 29.8 | 5A |
| | | | 5 | 1.6 | 25.9 | 3A |
| | | | 6 | 1.6 | 32.1 | 3A |
| 12 | 300 | 0.2 | 1 | 9.3 | | 7A |
| | | | 3 | 3.5 | | 6A–7A |
| | | | 5 | 2.5 | 20.3 | 6A–7A |
| | | | 6 | 1.7 | 28.8 | 6A |
| 13 | 285 | 0.4 | 2 | | | |
| | | | 4 | | | |
| | | | 6 | 4.1 | 26.7 | 6A–5A |
| 14 | 350 | 0.1 | ½ | 2.8 | 34.6 | 3A |
| | | | 1 | 1.1 | 36.7 | WW–WG |
| | | | 1½ | 0.8 | 39.8 | |
| | | | 2 | 0.8 | 39.2 | WW–WG |
| 15 | 350 | 0.5 | *0 | 5.9 | 26.7 | 6A |
| | | | ½ | 1.2 | 34.7 | 2A |
| | | | 1 | 0.8 | 33.9 | X |
| | | | 1½ | 0.7 | 35.3 | X |
| | | | 2 | 0.8 | 36.2 | WW |

*Sample taken as soon as a temperature of 350° C. was reached.

EXAMPLES 16–18

Table VI shows the effective disproportionation and bleaching of other rosin types. Conditions of treatment were essentially the same as in the foregoing examples except as indicated. The catalyst was 2,2'-thiobis(4-methyl-6-t-butylphenol). Acid analysis was by UV. The tall oil S-1 type rosin is a commercialy available rosin substantially the same as that identified in Example 1 except that it contains some bottoms.

Since MBP has the same structure as TBP except for —CH$_2$— in place of —S—, the data demonstrates the surprising character of the invention.

Example 20 of Table VII shows good disproportionation when a rosin sample having substantitally the same typical analysis as that of Example 1, except for presence of some bottoms material is treated as in Example 19. It will be noted in each example that the rosin was bleached

TABLE VI

| Example | Temp., °C. | Concentration, percent | Time, hours | Abietic Acid, percent | Dehydroabietic Acid, percent | Color |
|---|---|---|---|---|---|---|
| 16—Gum Rosin | 300 | 0.1 | Feed | 14.0 | | K |
| | | | 2 | 3.9 | 20.3 | N |
| | | | 5 | 2.4 | 22.2 | N |
| 17—Wood Rosin | 300 | 0.1 | Feed | 42.6 | | M |
| | | | 2 | 4.1 | 24.5 | X |
| | | | 3½ | 3.0 | 26.9 | WW–WG |
| | | | 5 | 2.3 | 27.6 | WG–N |
| 18—Tall Oil, S-1 Rosin | 210 | 0.1 | Feed | 29.9 | 20.2 | |
| | | | 2 | 2.7 | 25.4 | 3A |
| | | | 4 | 1.5 | 32.5 | X |
| | | | 6 | 1.3 | 31.6 | K |

Example 6 to give the corresponding hydrazone in each instance. Thus, 6-methylpyridine-2-carboxaldehyde reacts with the hydrazine to give 1-(10,11-dihydro-5H-dibenzo-[a,d]cyclohepten - 5 - yl)-4-(6-methyl-2-pyridylmethyleneamino)-piperazine melting at about 139–140° C. after recrystallization from hexane. 3-methylpyridine-2-carboxaldehyde reacts with the hydrazine to give 1-(10,11-dihydro-5H-dibenzo[a,d]cyclohepten-5-yl)-4-(3-methyl-2-pyridylmethyleneamino)piperazine melting at about 125° C. after recrystallization from a mixture of benzene and hexane. 3-methylpyridine-4-carboxaldehyde reacts with the aminopiperazine to give 1-(10,11-dihydro-5H-dibenzo [a,d]cyclohepten-5-yl)-4-(3 - methyl-4-pyridylmethyleneamino)piperazine melting at about 208–210° C. after recrystallization from a mixture of chloroform and hexane. In the same reaction, 5-ethylpyridine-2-carboxaldehyde gives 1 - (10,11 - dihydro-5H-dibenzo[a,d]cyclohepten-5-yl)-4-(5-ethyl-2-pyridylmethyleneamino)piperazine melting at about 182–183° C. after recrystallization from a mixture of benzene and hexane. The hydrazone obtained with 3-hydroxypyridine-2-carboxaldehyde is 1-(10,11-dihydro-5H-dibenzo[a,d]cyclohepten-5-yl)-4-(3 - hydroxy-2-pyridylmethyleneamino)piperazine melting at about 240–243° C. after recrystallization from a mixture of chloroform and hexane.

EXAMPLE 20

5 parts of N-(4-dimethylaminophenyl)-α-(1-oxido-4-pyridyl)nitrone is slurried with 25 parts of water and then acidified with 25 parts by volume of 3 N hydrochloric acid. An additional 10 parts of water is added to the mixture. Then, a solution of 5.7 parts of 1-(10,11-dihydro - 5H - dibenzo[a,d]cyclohepten - 5 - yl) - 4 - aminopiperazine in 15 parts by volume of 3 N hydrochloric acid is added to the mixture. A yellow precipitate forms. This is separated by filtration and washed with cold water. The solid is then slurried in water and benzene and the mixture is made neutral with dilute potassium carbonate solution. The benzene layer is then separated, washed with water, and dried, and the solution is concentrated to a small volume at reduced pressure. Ether is added to the resultant concentrate which is then cooled to give crystals of 1-(10,11-dihydro-5H-dibenzo[a,d]cyclohepten - 5 - yl) - 4 - [(1 - oxido - 4 - pyridyl)methyleneamino]piperazine. This compound melts at about 189–190° C. and it has the following formula

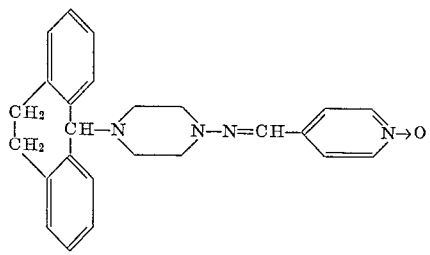

Using the appropriate nitrone, an analogous product can be obtained having a 1-oxidomethylpyridine group in place of the 1-oxidopyridyl structure in the compound described above.

EXAMPLE 21

An equivalent quantity of 1-methyl-4-piperidone is substituted for the piperonal and the procedure of Example 6 is repeated to give 1-(10,11-dihydro-5H-dibenzo[a,d] cyclohepten - 5 - yl) - 4 - (1 - methyl - 4 - piperidylideneamino)piperazine melting at about 173–174° C. after recrystallization from a mixture of benzene and ether.

EXAMPLE 22

A mixture of 5 parts of 1-(fluoren-9-ylideneamino) piperazine, 4.5 parts of 5-chloro-5H-dibenzo[a,d]cycloheptene, 10 parts of potassium carbonate, and 200 parts of acetone is stirred at room temperature for 19 hours. The mixture is filtered to remove salts and the resulting solution is concentrated to a small volume at reduced pressure. Hexane is added to the resultant concentrate which is then cooled to give crystals of 1-(5H-dibenzo-[a,d]cyclohepten - 5 - yl) - 4 - (fluoren - 9 - ylideneamino)piperazine. This compound melts at about 174–176° C. after recrystallization from a mixture of chloroform and hexane.

What is claimed is:
1. A compound of the formula

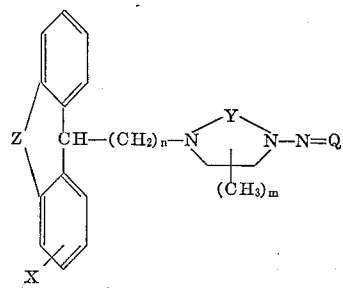

wherein X is selected from the group consisting of hydrogen, methyl, and chlorine; Y is lower alkylene containing from 2 to 3 carbon atoms inclusively and separating the nitrogen atoms attached thereto by at least 2 carbon atoms; Z is selected from the group consisting of vinylene, ethylene, and trimethylene; m and n are each a whole number between 0 and 1 inclusive; Q is selected from the group consisting of 1-methyl-4-piperidylidene, 9-fluorenylidene and =CRR' wherein R is selected from the group consisting of methyl, phenyl hydroxyphenyl, methylenedioxyphenyl, cyanophenyl, pyridyl, methylpyridyl, ethylpyridyl, N-oxides of the aforesaid pyridyls, and hydroxypyridyl; and R' is selected from the group consisting of hydrogen and methyl.

2. A compound according to claim 1 which has the formula

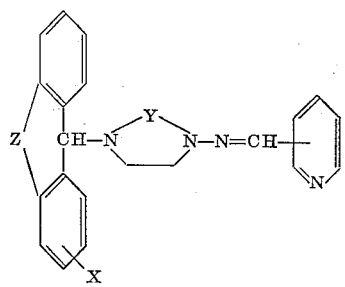

wherein Y and Z are each selected from the group consisting of ethylene and trimethylene; and X is selected from the group consisting of hydrogen, methyl, and chlorine.

3. A compound according to claim 1 which has the formula

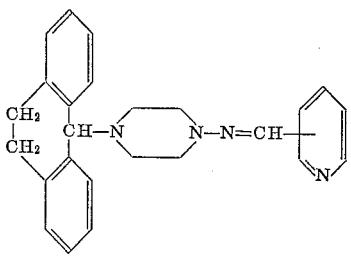

4. A compound according to claim 1 which is 1-(10, 11 - dihydro - 5H - dibenzo[a,d]cyclohepten - 5 - yl) - 4-(2-pyridylmethyleneamino)piperazine.

5. A compound according to claim 1 which has the formula

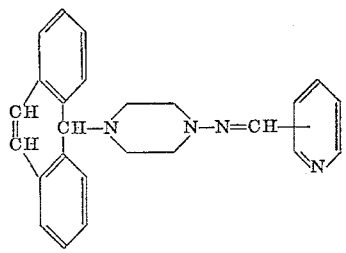

6. A compound according to claim 1 which is 1-(5H-dibenzo[a,d]cyclohepten - 5 - yl) - 4 - (4 - pyridylmethyleneamino)piperazine.

7. A compound according to claim 1 which has the formula

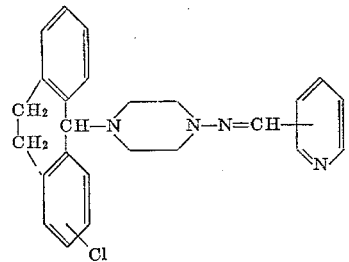

8. A compound according to claim 1 which is 1-(2-chloro - 10,11 - dihydro - 5H - dibenzo[a,d]cyclohepten-5 - yl) - 4 - (4 - pyridylmethyleneamino)piperazine.

9. A compound according to claim 1 which is 1-(3-chloro - 10,11 - dihydro - 5H - dibenzo[a,d]cyclohepten-5-yl)-4-(4-pyridylmethyleneamino)piperazine.

10. A compound according to claim 1 which has the formula

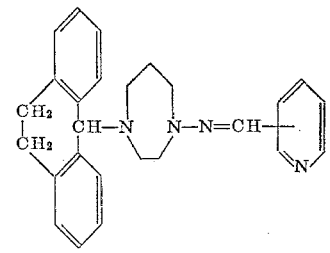

11. A compound according to claim 1 which is 1-(10, 11 - dihydro - 5H - dibenzo[a,d]cyclohepten - 5 - yl) - 4-(4-pyridylmethyleneamino)homopiperazine.

12. A compound according to claim 1 which has the formula

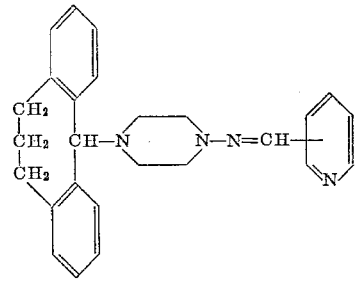

13. A compound according to claim 1 which is 1-(5,6,7,12 - tetrahydrodibenzo[a,d]cycloocten - 12 - yl) - 4 - (4-pyridylmethyleneamino)piperazine.

14. A compound according to claim 1 which is 1-(10, 11 - dihydro - 5H - dibenzo[a,d]cyclohepten - 5 - yl) - 4-(6 - methyl - 2 - pyridylmethyleneamino)piperazine.

15. A compound according to claim 1 which is 1-(10, 11 - dihydro - 5H - dibenzo[a,d]cyclohepten - 5 - yl) - 4-[(1 - oxido - 4 - pyridyl)methyleneamino]piperazine.

References Cited

UNITED STATES PATENTS 3,290,300   12/1966   Cusic et al. _____ 260—240

JOHN D. RANDOLPH, *Primary Examiner.*

UNITED STATES PATENT OFFICE
CERTIFICATE OF CORRECTION

Patent No. 3,377,344                      April 9, 1968

John W. Cusic et al.

It is certified that error appears in the above identified patent and that said Letters Patent are hereby corrected as shown below:

Column 5, line 13, "cyclopentene" should read -- cycloheptene --. Column 7, line 32, cancel "more".

Signed and sealed this 20th day of January 1970.

(SEAL)
Attest:

Edward M. Fletcher, Jr.                      WILLIAM E. SCHUYLER, JR.
Attesting Officer                              Commissioner of Patents